US009637061B2

(12) United States Patent
Mazzocchi et al.

(10) Patent No.: US 9,637,061 B2
(45) Date of Patent: May 2, 2017

(54) EXTERNAL DOWN STOPS FOR GLOVE BOX

(71) Applicant: FORD GLOBAL TECHNOLOGIES, LLC, Dearborn, MI (US)

(72) Inventors: Nicholas Andrew Mazzocchi, Ann Arbor, MI (US); Robert Townsend, Ann Arbor, MI (US); Joseph Platz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/554,829

(22) Filed: Nov. 26, 2014

(65) Prior Publication Data

US 2016/0144793 A1    May 26, 2016

(51) Int. Cl.
*B60R 7/06*    (2006.01)
*E05B 83/30*    (2014.01)

(52) U.S. Cl.
CPC ............... *B60R 7/06* (2013.01); *E05B 83/30* (2013.01)

(58) Field of Classification Search
CPC .......... B60R 7/06; B60R 21/045; E05B 83/30
USPC .................... 999/37.12, 72, 187.05
See application file for complete search history.

(56) References Cited

U.S. PATENT DOCUMENTS

| 4,743,060 A * | 5/1988 | Hishida ............... B60R 7/06 16/257 |
| 5,577,770 A * | 11/1996 | Sinner ............... B62D 21/15 280/751 |
| 5,868,448 A | 2/1999 | Izumo |
| 6,076,878 A * | 6/2000 | Isano ............... B60R 7/06 16/82 |
| 6,899,364 B2 | 5/2005 | Park et al. |
| 7,210,704 B2 * | 5/2007 | Ko ............... B60R 21/045 280/748 |
| 7,293,800 B2 * | 11/2007 | Abe ............... B60R 21/04 280/751 |

(Continued)

FOREIGN PATENT DOCUMENTS

| FR | KR 20150066468 A | * 6/2015 | ............... B60R 7/06 |
| JP | S57175474 A | 10/1982 | |

(Continued)

OTHER PUBLICATIONS

English machine translation of JP11115637.

(Continued)

*Primary Examiner* — Pinel Romain
(74) *Attorney, Agent, or Firm* — Vichit Chea; King & Schickli, PLLC

(57) ABSTRACT

A glove box supported by an instrument panel includes a storage compartment displaceable between an open position and a closed position, and at least one resilient arm protruding from an exterior surface of the storage compartment through an aperture in the instrument panel. The resilient arm may have a first surface for contacting an edge of the aperture and deflecting the resilient arm during installation of the storage compartment and a second surface for limiting displacement of the storage compartment once installed. An application of a force to the resilient arm allows displacement of the storage compartment beyond the open position allowing removal of the glove box from the instrument panel.

19 Claims, 10 Drawing Sheets

(56) References Cited

U.S. PATENT DOCUMENTS

| | | | |
|---|---|---|---|
| 7,311,327 B2 * | 12/2007 | Yamazaki | B60R 21/045 280/751 |
| 7,484,792 B2 * | 2/2009 | Penner | B60R 7/06 280/752 |
| 7,712,814 B2 * | 5/2010 | Matsui | B60R 7/06 16/387 |
| 8,118,348 B2 * | 2/2012 | Taracko | B60R 7/06 296/187.05 |
| 8,714,615 B2 * | 5/2014 | Mercey | B60R 7/06 296/37.12 |
| 2007/0205624 A1 * | 9/2007 | Zellner, Jr. | E05B 83/30 296/37.12 |

FOREIGN PATENT DOCUMENTS

| | | | | |
|---|---|---|---|---|
| JP | S5820540 A | 2/1983 | | |
| JP | S6432941 A | 2/1989 | | |
| JP | 11115637 A | 4/1999 | | |
| JP | 2005313751 A | 11/2005 | | |
| JP | WO 2011010519 A1 * | 1/2011 | | B60R 7/06 |
| JP | 2012076617 A | 4/2012 | | |
| JP | WO 2013187388 A1 * | 12/2013 | | E05B 83/30 |
| KR | 100377153 B1 | 3/2003 | | |
| KR | 20120133830 A | 12/2012 | | |
| KR | 20140071525 A * | 6/2014 | | |
| SE | EP 2295682 A1 * | 3/2011 | | B60R 7/06 |

OTHER PUBLICATIONS

English machine translation of JP2005313751.
English machine translation of JP2012076617.
English machine translation of KR100377153.
English machine translation of KR20120133830.

* cited by examiner

EXTERNAL DOWN STOPS FOR GLOVE BOX

TECHNICAL FIELD

This document relates generally to down stops used to limit movement of a glove box in a vehicle.

BACKGROUND

Glove boxes are a common component of vehicles and are most often designed with a door that is contoured to mount flush with an instrument panel when the door is in a closed position. Behind the door is a storage compartment for holding personal items, for example, maps, flashlights, and vehicle manuals. Down stops which limit displacement of the glove box when opened are known in the art and are typically positioned at least partially within the storage compartment or in an area visible by occupants of the vehicle. Positioning the down stops even partially within the storage compartment, however, limits the storage space provided within the storage compartment. Even more, positioning the down stops so as to eliminate their visibility by the vehicle occupants is desired and lends to a sense of higher quality craftsmanship and a preferred overall look of the vehicle and instrument panel.

In addition to being well positioned, the down stops should also allow for easy insertion and removal of the glove box during manufacturing or at any point in time, for maintenance or the like, if the need were to arise. Preferably, insertion and removal could be made without the need for tools or the removal of additional parts.

This document relates to a glove box supported by an instrument panel having down stops that are external of the storage compartment and not visible to the vehicle occupants. Advantageously, this allows for the entirety of the storage compartment to be used for storage by occupants of the vehicle. Also, the down stops are positioned outside of the line of sight of the occupants of the vehicle. Doing so provides an improved overall look of the vehicle and instrument panel, and heightens the sense of quality of craftsmanship. Even more, the down stops are made of a resilient material which allows for deflection to accommodate installation and removal of the glove box without the need for tools or additional parts.

SUMMARY

In accordance with the purposes and benefits described herein, a glove box supported by an instrument panel is provided. That glove box may be broadly described as comprising a storage compartment displaceable between an open position and a closed position, and at least one down stop, or resilient arm, protruding from an exterior surface of the storage compartment through an aperture in the instrument panel. The resilient arm may have a first surface for contacting an edge of the aperture and deflecting the resilient arm during installation of the storage compartment and a second surface for limiting displacement of the storage compartment once installed. An application of a force to the resilient arm allows displacement of the storage compartment beyond the open position allowing removal of the glove box from the instrument panel.

In one possible embodiment, the first surface of the resilient arm gradually projects from the arm to deflect the resilient arm through contact with the aperture edge. In another possible embodiment, the second surface projects from the resilient arm to contact the aperture edge.

In one possible embodiment, the second surface is substantially flat and substantially perpendicular to the resilient arm.

In another possible embodiment, the at least one resilient arm includes two resilient arms positioned adjacent side exterior surfaces of the storage compartment. In yet another possible embodiment, the first and second surfaces of the two resilient arms project away from each other.

In one possible embodiment, the glove box may include at least one hinge rib for rotatably supporting the storage compartment between the open position and the closed position. In another possible embodiment, the resilient arm may include a tab formed adjacent a distal end of the resilient arm for receiving the force, and the second surface may project from the arm adjacent to the tab.

In one possible embodiment, the glove box supported by an instrument panel is incorporated in a vehicle.

In accordance with an additional aspect, a glove box for a vehicle is provided. The glove box comprises a storage compartment displaceable between an open position and a closed position and at least one resilient arm protruding from an exterior surface of the storage compartment. The resilient arm may have a first surface for contacting an edge of a vehicle aperture and deflecting the resilient arm during installation of the storage compartment and a second surface for limiting displacement of the storage compartment once installed in the vehicle. Application of a force to the arm allows displacement of the storage compartment beyond the open position.

In one possible embodiment, the at least one resilient arm may include a tab formed adjacent a distal end for receiving the force.

In one possible embodiment, the at least one resilient arm may include two resilient arms protruding from a bottom exterior surface of the storage compartment.

In one possible embodiment, the first surface of each resilient arm gradually projects from the resilient arm to deflect the resilient arm through contact with the aperture edge, and the second surface of at least one of the two resilient arms is substantially flat and substantially perpendicular to the at least one of the two resilient arms.

In another possible embodiment, the first and second surfaces of each resilient arm project in the same direction, and the first surface of a first resilient arm of said two resilient arms project away from the first surface of a second resilient arm of the two resilient arms.

In one possible embodiment, the glove box further comprises at least one hinge rib for rotatably supporting the storage compartment between the open position and the closed position.

In accordance with an additional aspect, a method is provided of removing a glove box from an instrument panel of a vehicle. The method may be broadly described as comprising the steps of: (a) applying a force to at least one resilient arm protruding from an exterior surface of a storage compartment of the glove box, the force sufficient to temporarily displace the at least one resilient arm allowing a second projecting surface of the at least one resilient arm to avoid contact with an edge of an aperture in the instrument panel; (b) rotating the glove box from the closed position past the open position while applying the force such that the second projecting surface of the at least one resilient arm passes the edge of the aperture in the instrument panel; and (c) removing the glove box from the instrument panel of the vehicle.

In one possible embodiment, the force may be applied to a tab formed adjacent a distal end of the at least one resilient arm. In one another possible embodiment, the second projecting surface of the at least one resilient arm may be substantially flat and substantially perpendicular to the at least one resilient arm preventing rotation of the glove box past the open position when the force is not applied.

In one possible embodiment, the at least one resilient arm may include a first projecting surface for contacting the edge of the aperture in the instrument panel and deflecting the resilient arm during installation of the glove box. In another possible embodiment, the first projecting surface may be between the tab and the second projecting surface.

In the following description, there are shown and described several preferred embodiments of the glove box supported by an instrument panel, the glove box for a vehicle, and the related method. As it should be realized, the systems and method are capable of other, different embodiments and their several details are capable of modification in various, obvious aspects all without departing from the systems and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the drive system and together with the description serve to explain certain principles thereof. In the drawing figures.

Figure 8A:
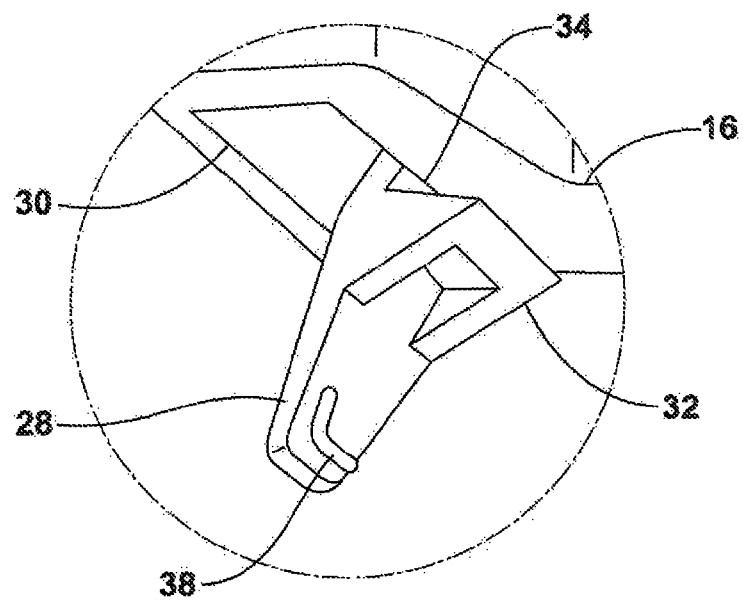
FIG. 8A is an isometric view of a resilient arm of a glove box down stop in a normal position with the glove box in an open position.
Figure 8B:
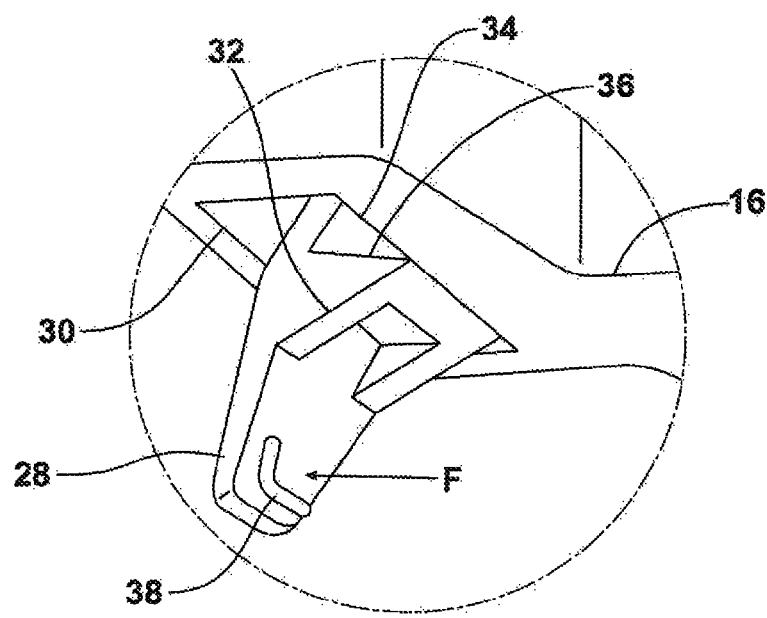
FIG. 8B is an isometric view of the resilient arm of the glove box down stop at a point of maximum deflection, caused by an applied force, such that a second surface of the resilient arm can avoid contact with an edge of an aperture of an instrument panel during removal.
Figure 8C:
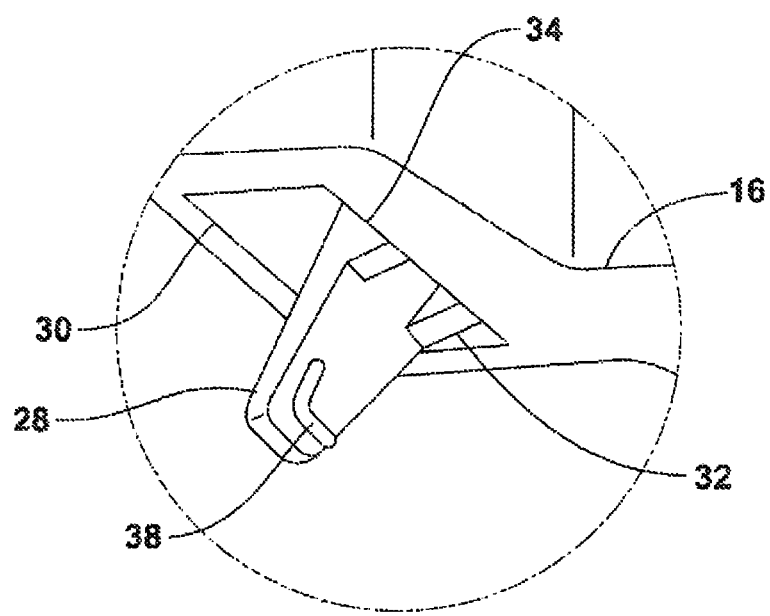
Figure 8D:
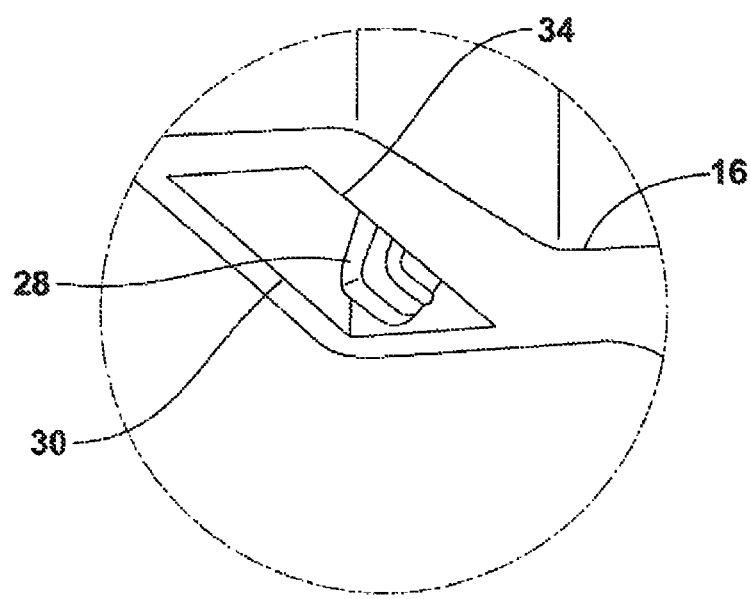

FIG. 8C is an isometric view of the resilient arm of the glove box down stop being withdrawn through the aperture of the instrument panel during removal of the glove box and partially deflected from a normal position by contact of a first surface of the resilient arm by the edge of the aperture; and FIG. 8D is an isometric view of the resilient arm of a glove box down stop exiting the aperture of the instrument panel during removal of the glove box and in the normal position due to a lack of contact of the first surface of the resilient arm by the edge of the aperture.

Reference will now be made in detail to the present preferred embodiments of the glove box, examples of which are illustrated in the accompanying drawing figures.

DETAILED DESCRIPTION

Figure 1:
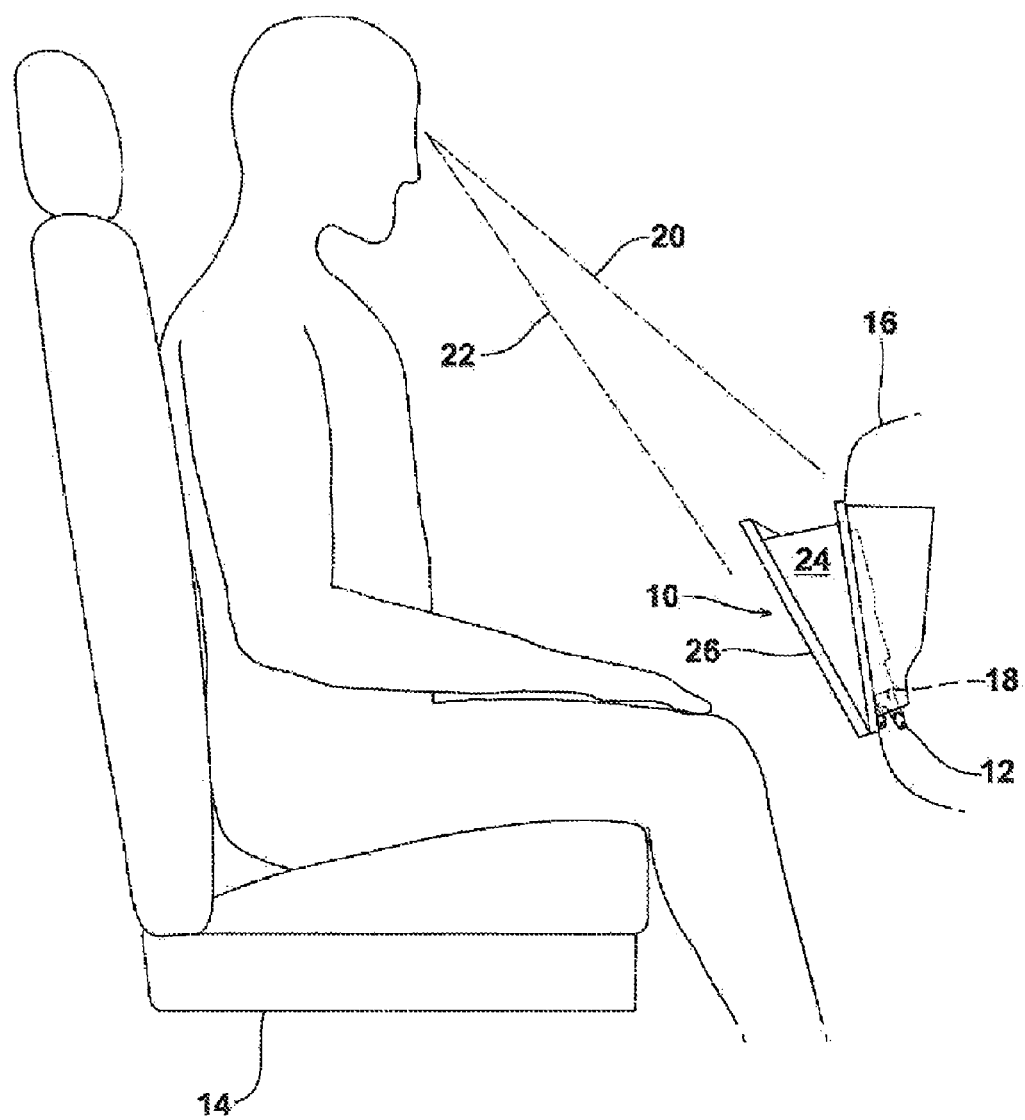
FIG. 1 is a side elevational view of a portion of a vehicle showing a down stop in one position external to the glove box and hidden from the line of sight of a vehicle occupant seated in a passenger seat of the vehicle.

Reference is now made to FIG. 1 which broadly illustrates an embodiment of a glove box 10 having external down stops 12 and positioned within a vehicle. The vehicle is only partially shown including seat 14 and instrument panel 16. The remainder of the vehicle is not shown for clarity. As shown, the glove box 10 is supported by the instrument panel 16 of the vehicle. The external down stops 12 protrude from an exterior surface 18 of the glove box 10 and through apertures 30 in the instrument panel 16. As shown by reference lines 20 and 22, the glove box 10 prevents the external down stops 12 from being visible to the occupant. In other words, the external down stops 12 are positioned outside of the line of sight of the occupants of the vehicle.

Figure 2:
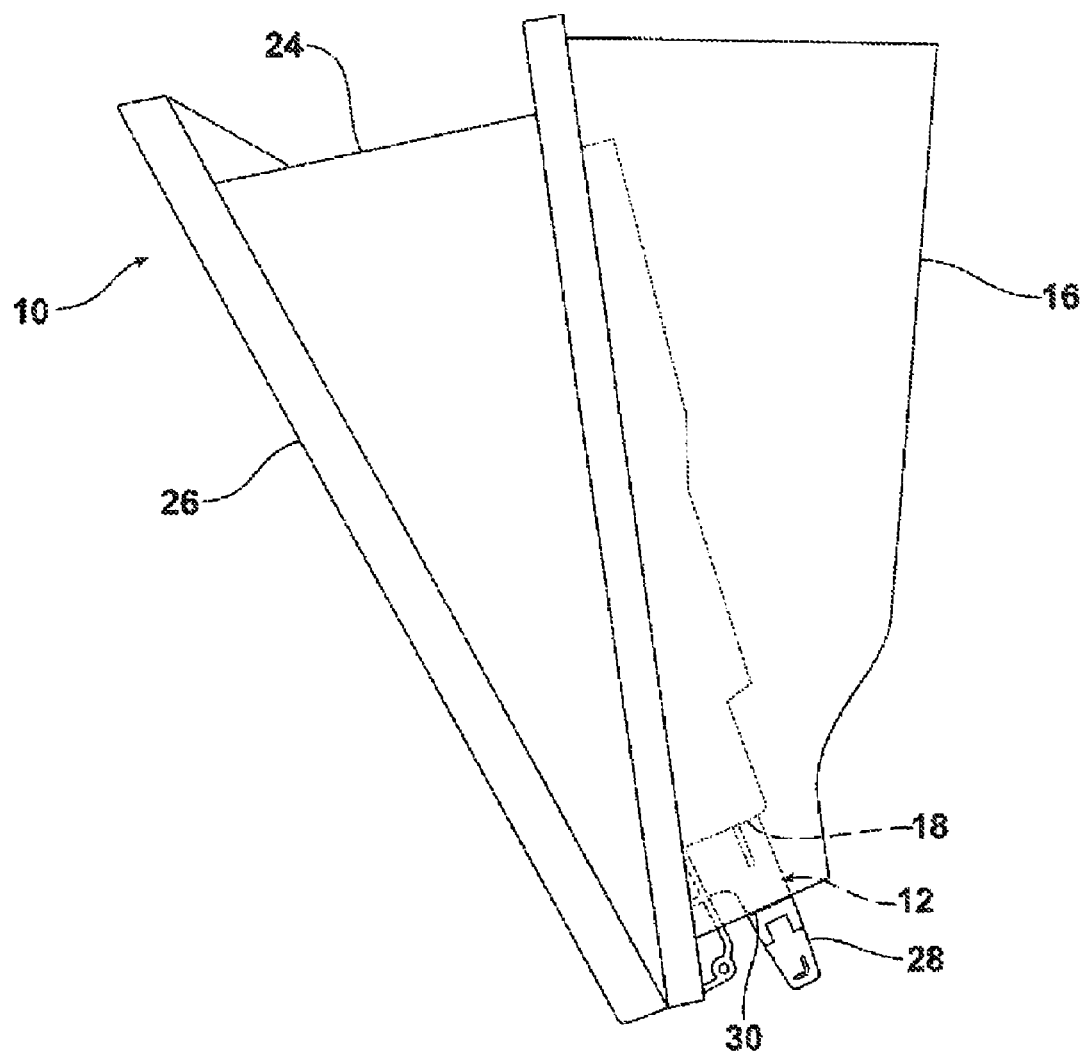
FIG. 2 is a side elevational view of a glove box and instrument panel showing the down stop in the position shown in FIG. 1.

As shown in FIG. 2, the glove box 10 includes a storage compartment 24 for holding personal items, and is displaceable between an open position (as shown in FIG. 2) and a closed position. In this embodiment, the glove box 10, and particularly a door 26 thereof, is contoured to mount flush with the instrument panel 16 when the glove box is in the closed position. The glove box 10 in this embodiment includes two down stops 12 although only one down stop is visible in this view. Other embodiments may include one down stop or more than two down stops. The down stops 12 include a resilient arm 28 protruding from the exterior surface 18 of the glove box 10 or storage compartment 24. The resilient arm 28 passes through an aperture 30 in the instrument panel 16 during installation and removal. Similarly, the resilient arm 28 partially moves through the aperture 30 in the instrument panel 16 during displacement of the glove box 10 from the open position to the closed position and vice-versa during normal operation.

Figure 3:
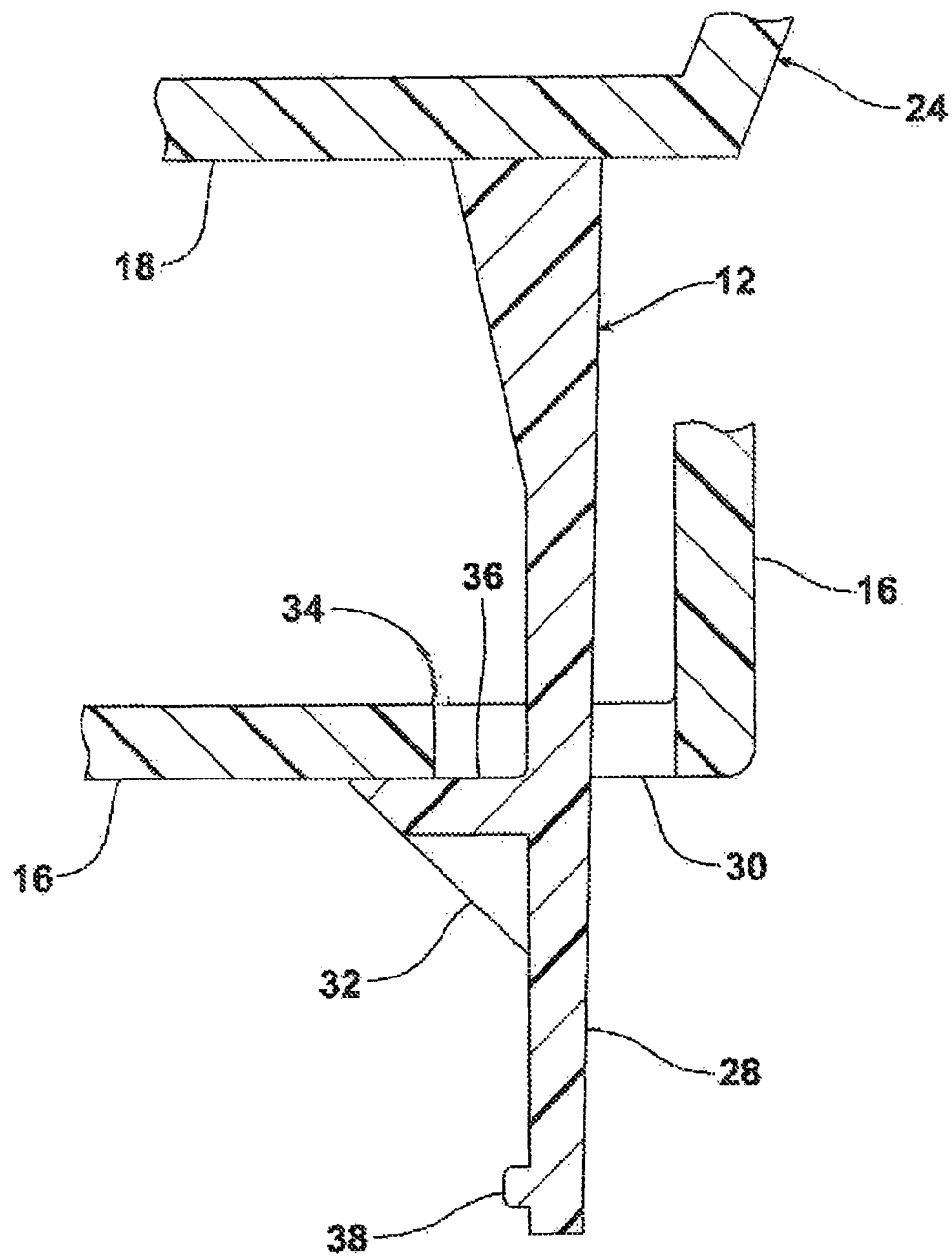
FIG. 3 is a partial view of a section cut through the glove box and instrument panel of FIG. 2 showing a surface of the down stop in contact with an edge of an aperture in the instrument panel.

As shown in FIG. 3, the down stop 12 protrudes from the exterior surface 18 of the storage compartment 24. This positioning allows for the entirety of the storage compartment 24 to be used for storage by occupants of the vehicle. Even more, the down stops 12 are positioned such that the down stops are not visible to the occupants of the vehicle.

This provides an improved overall look of the vehicle and instrument panel 16, and heightens the sense of quality of craftsmanship. In one embodiment, the exterior surface 18 of the storage compartment 24 is a bottom surface. In other embodiments, the exterior surface could be a rear, side and/or top surface of the instrument panel depending on the particular application.

As partially described above, the down stop 12 includes a resilient arm 28 having a first surface 32 for contacting the edge 34 of the aperture 30 and deflecting the resilient arm during installation of the glove box 10 and a second surface 36 for limiting displacement of the storage compartment once installed. The first surface 32 gradually projects from the resilient arm 28 to deflect the resilient arm through contact with the aperture edge 34. In the embodiment shown, the first surface 32 gradually projects from the resilient arm 28 at an approximately 45° angle. In other embodiments, the first surface can gradually project from the resilient arm at any angle depending on the particular application so long as the first surface is sufficient to deflect the resilient arm through contact with the aperture edge.

The second surface 36 projects from the resilient arm 28 to contact the instrument panel 16 adjacent the aperture edge 34. In the embodiment shown, the second surface 36 is substantially flat and substantially perpendicular to the resilient arm 28. In other words, in this embodiment, the second surface 36 is substantially flush with the instrument panel 16 when making contact therewith in the open position. It is this contact between the second surface 36 of the resilient arm 28 and the instrument panel 16 which limits the displacement of the glove box 10 in its most open position. In other embodiments, the second surface could take near any shape or angle so long as the surface is sufficient to limit the displacement of the glove box to the open position. For example, without limitation, the second surface could be oval shaped and the angle between the second surface and the resilient arm could be the perpendicular 90° or less in either direction depending on the particular application.

Figure 4:
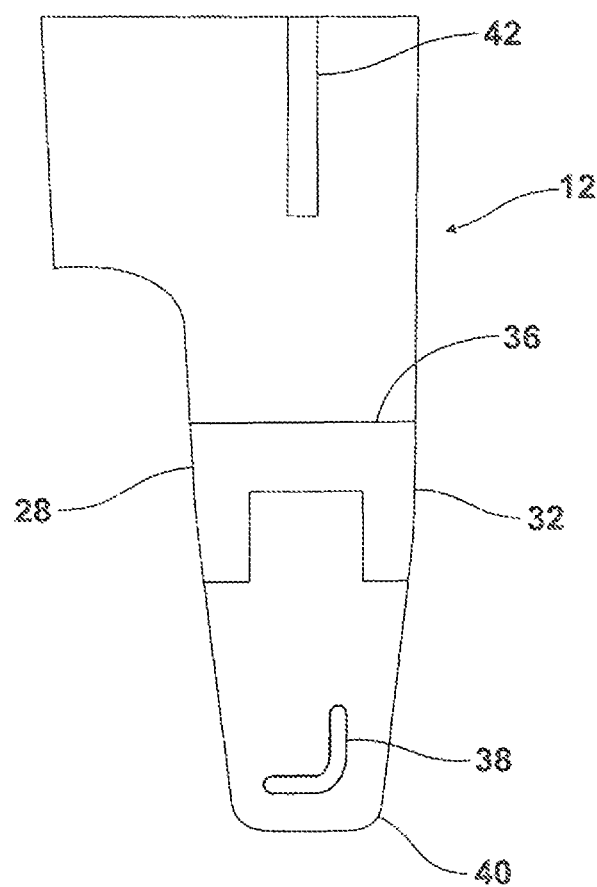
FIG. 4 is an end elevational view of a down stop.

In one possible embodiment shown in FIG. 4, the resilient arm 12 includes a tab 38 formed adjacent a distal end 40 of the resilient arm for receiving a force when it is desired to displace the glove box 22 beyond the open position in order to conduct maintenance or to remove the glove box entirely. In this embodiment, the first surface 32 projects from the resilient arm 28 adjacent to the tab 38. The length of the tab 38 can vary depending on the particular application and the tab, curved or in generally any shape, is provided to simplify application of the force by a finger or tool without them slipping off of the tab. In other embodiments, the tab 38 may not be utilized in favor of applying the force to the first surface 32 of the resilient arm 28 or elsewhere along the arm so long as the force is sufficient to deflect the resilient arm enough to allow it to pass through the aperture 30 in the instrument panel 16. A rib 42 may also be provided on the down stop 12 to strengthen the resilient arm 28 and/or provide guidance during installation/removal.

Figure 5:
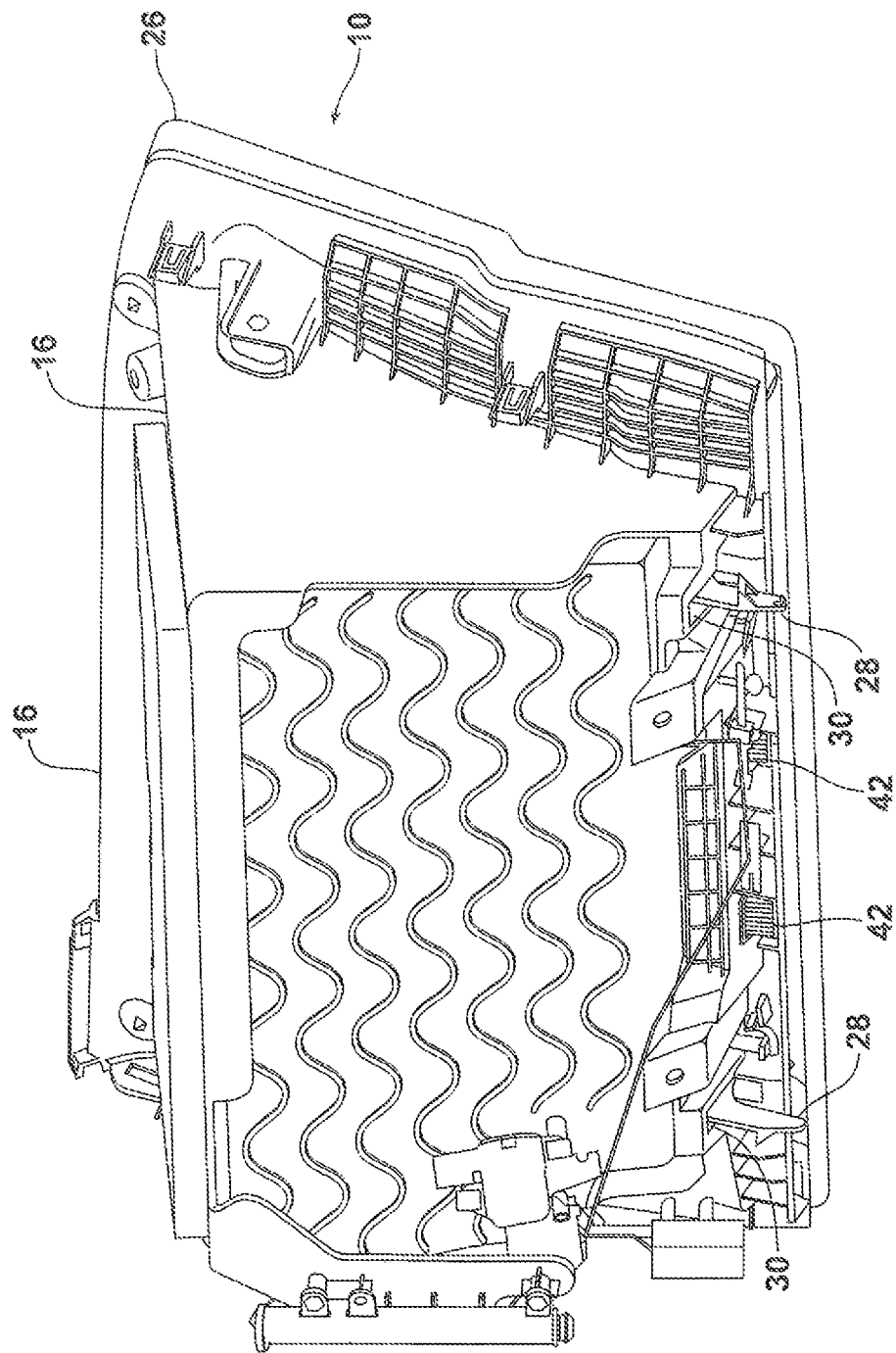
FIG. 5 is an isometric view of a glove box supported by an instrument panel with a glove box door in a closed position and down stops in a fully extended position.

As shown in FIG. 5 from a rear side of the instrument panel 16, resilient arms 28 of the down stops 12 extend through apertures 30 of the instrument panel in the closed position. In this position, the resilient arms 28 have returned from a deflected position caused by contact between the first surface 32 and aperture edge 34 while passing through the aperture 30 of the instrument panel 16 during installation to a normal position. The distance between the second surface 36 of the resilient arm 28 and the instrument panel 16 defines the amount of displacement available between the open and closed positions. The greater the distance, the more displacement is available. Hinge ribs 42 rotatably support the glove box 10, and more particularly the storage compartment 24, in the open position and the closed position, and throughout displacement therebetween. The hinge ribs 42 are attached to an external surface of the storage compartment 24, extend through apertures in the instrument panel 16 and are removable with the glove box 10.

Figure 6:
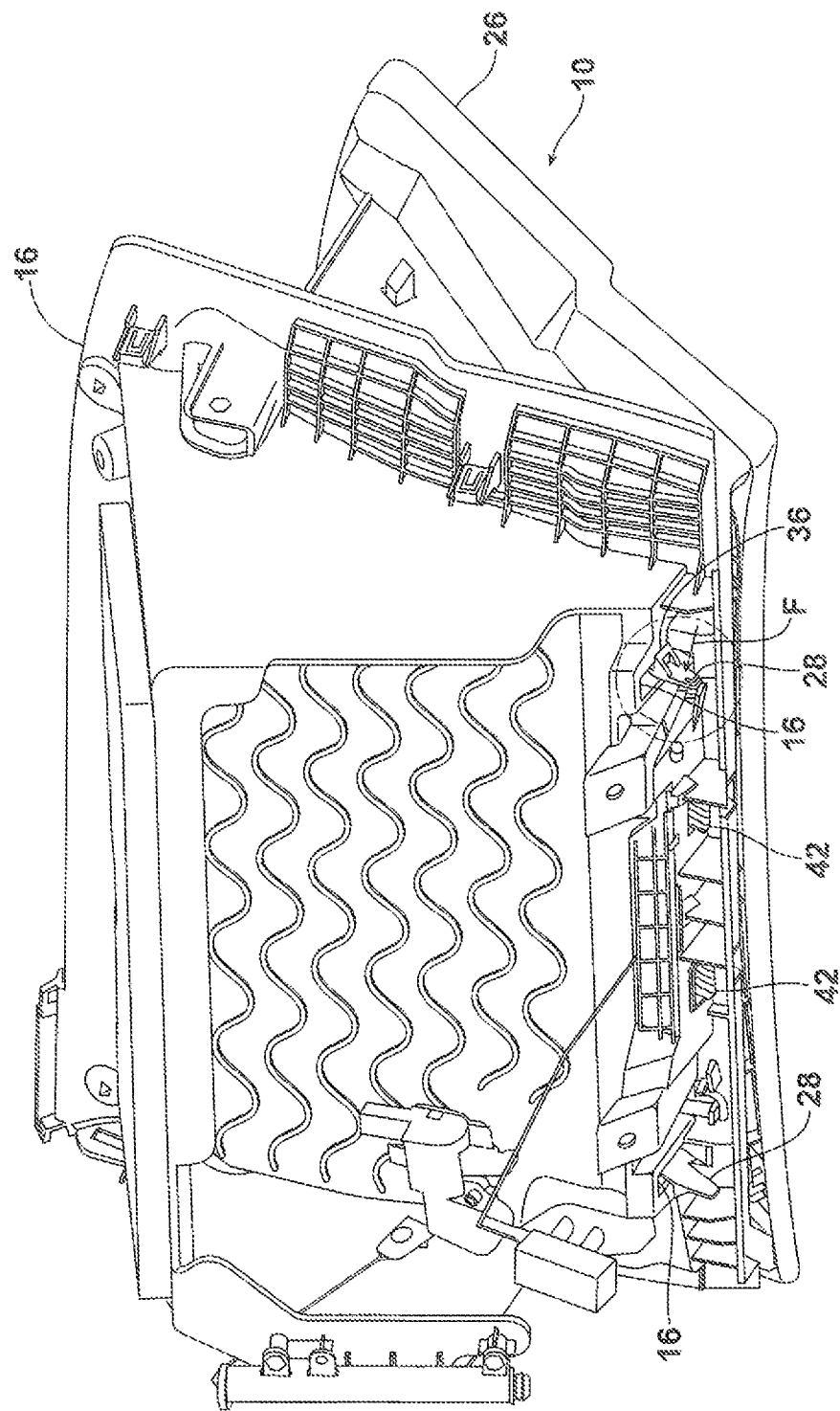
FIG. 6 is an isometric view of the glove box supported by an instrument panel with a glove box door in an open position and a down stop contacting an edge of an aperture in the instrument panel to prevent displacement beyond the open position.

FIG. 6 shows the resilient arm 28 in contact with the instrument panel 16 from the rear side of the instrument panel in the open position. More specifically, the second surface 36 of the resilient arm 28 is in contact with the instrument panel 16 preventing further displacement of the glove box 10. Hinge ribs 42 are likewise retracted within apertures of the instrument panel 16 allowing displacement of the glove box 10. As noted above, application of a force (shown by arrow F) to the tab 38 at the distal end 40 of the resilient arm 28 or elsewhere along the arm allows displacement of the glove box 10 beyond the open position, for example, for removal. As also shown in this FIG. 6, the first and second surfaces 32, 36 project from the resilient arm 28 toward the outside of the glove box 10. In other words, the surfaces project away from one another.

Depending on the particular application, these surfaces could project from the resilient arms toward the inside of the glove box, i.e., toward one another, and would necessarily contact the opposing aperture edge. Even more, in embodiments with two or more resilient arms, the surfaces could project from the resilient arm toward the inside and/or outside of the glove box contacting adjacent aperture edges. In other words, the projecting surfaces could face each other, face opposite each other, all face one direction, all the other, or the projecting surfaces could even face multiple directions in embodiments with three or more.

Figure 7A:
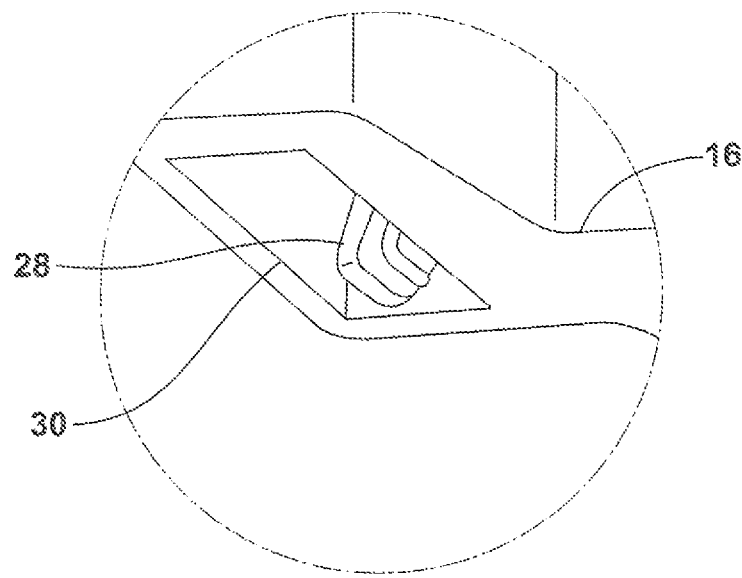
FIG. 7A is an isometric view of a resilient arm of a glove box during installation of the glove box showing the resilient arm entering an aperture in an instrument panel in a normal position.

In another aspect of the invention, a method of installing a glove box 10 in an instrument panel 16 of a vehicle is illustrated in FIGS. 7A-7D. The partial views represented in these Figures are taken from the encircled portion of FIG. 6 where arrow F is located. As shown in FIG. 7A, a resilient arm 28 of the glove box 10 is in a normal or resting position with the glove box in a displaced or open position. As the glove box 10 is installed in the instrument panel 16, the resilient arm 28 is inserted into an aperture 30 of the instrument panel.

Figure 7B:
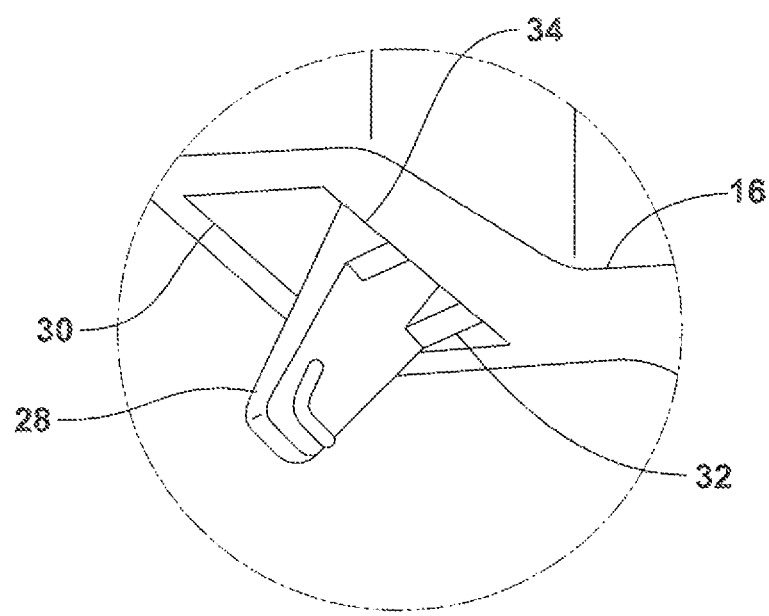
FIG. 7B is an isometric view of the resilient arm of the glove box down stop entering the aperture of the instrument panel during installation of the glove box and being deflected from the normal position by contact of a first surface of the resilient arm by an edge of the aperture.

As shown in FIG. 7B, a first projecting surface 32 of the resilient arm 28 contacts an edge 34 of the aperture 30 during installation causing the resilient arm to be deflected away from the edge of the aperture and its normal position. Since the first surface 32 gradually projects from the resilient arm 28, the deflection of the resilient arm from the normal position is likewise gradual until the first surface of the resilient arm no longer contacts the edge of the aperture of the instrument panel.

Figure 7C:
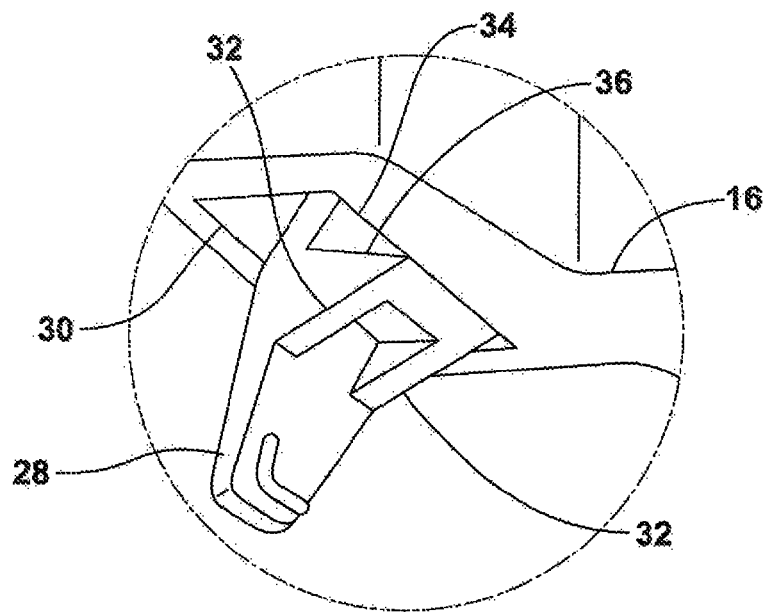
FIG. 7C is an isometric view of the resilient arm of the glove box down stop at a point of maximum deflection from the normal position by contact of the first surface of the resilient arm by the edge of the aperture.
Figure 7D:
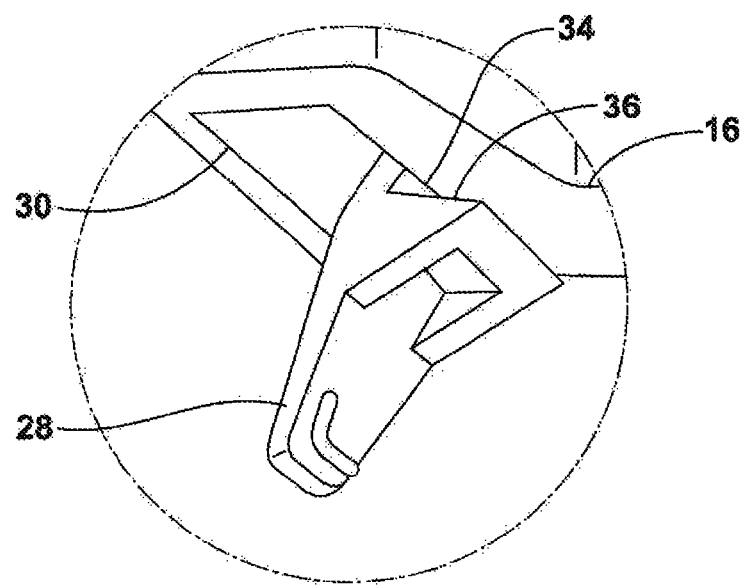
FIG. 7D is an isometric view of the resilient arm of the glove box down stop in the normal position after the first surface of the resilient arm passes through the aperture of the instrument panel during installation of the glove box and with the glove box in an open position.

At this point, as illustrated in FIG. 7C, the resilient arm 28 is at a point of maximum deflection during the installation process. Once the first surface 32 of the resilient arm 28 is past the edge 34 of the aperture 30 as shown in FIG. 7D, the resilient arm returns to the normal position. In other words, once the first projecting surface 32 is clear of the aperture 30 the resilient arm 28 will return to its normal or undeflected position. In this position, the second surface 36 of the resilient arm 28 prevents displacement of the glove box 10 beyond the open position unless a force is applied to the resilient arm to initiate removal of the glove box.

In another aspect of the invention, a method of removing a glove box 10 from an instrument panel 16 of a vehicle is illustrated in FIGS. 8A-8D. The partial views represented in these Figures are taken from the encircled portion of FIG. 6 where arrow F is located. As shown in FIG. 8A, a resilient arm 28 of the glove box 10 is in a normal or resting position with the glove box in a displaced or open position. In this position, the resilient arm 28 acts as a stop through contact with the instrument panel 16 adjacent the aperture edge 34 in order to limit displacement. In order to remove the glove box 10, a force F is applied to a tab 38 of the resilient arm 28 protruding from the exterior surface 18 of the storage compartment 24 of the glove box 10.

As shown in FIG. 8B, the force should be sufficient to temporarily displace the resilient arm 28 allowing the second projecting surface 36 of the resilient arm to avoid contact with the edge 34 of the aperture 30 in the instrument panel 16. Once so displaced, the glove box 10 can be rotated past the open position while applying the force such that the second projecting surface 36 of the resilient arm 28 passes the edge 34 of the aperture 30 in the instrument panel 16.

At this point, as illustrated in FIG. 8C, the force F can be removed from the tab 38 allowing the first projecting surface 32 of the resilient arm 28 to maintain the arm in a deflected position through contact with the edge 34 of the aperture 30 until the first projecting surface is clear of the aperture allowing the resilient arm to return to its normal or undeflected position. Once the resilient arm 28 clears the aperture 30 as shown in FIG. 8D, the glove box 10 may be removed from the instrument panel 16 of the vehicle.

As indicated above, the force F may be applied to the tab 38 formed adjacent a distal end 40 of the resilient arm 28 or elsewhere along the arm including the first and/or second protruding surfaces 32, 36. The first projecting surface 32 of the resilient arm 28 contacts the edge 34 of the aperture 30 in the instrument panel 16 and deflects the resilient arm during installation/removal of the glove box 10. The second projecting surface 36 of the resilient arm 28 may be substantially flat and substantially perpendicular to the resilient arm preventing rotation of the glove box 10 past the open position when the force F is not applied. The first projecting surface 32 may be between the tab 38 and the second projecting surface 36 in one embodiment. Each of the tab, the first projecting surface and the second projecting surface may take varying forms as described in more detail above depending on the particular application.

In summary, numerous benefits result from providing a glove box 10 supported by an instrument panel 16 having down stops 12 that are external of the storage compartment 24 and not visible to the vehicle occupants. The resilient arms 28 of the down stops 12 are relatively inexpensive to produce, and allow for simple installation and removal of the glove box 10 without the need for tools or additional parts. Advantageously, this allows for the entirety of the storage compartment to be used for storage by occupants of the vehicle. Also, the down stops are positioned outside of the line of sight of the occupants of the vehicle. Doing so provides an improved overall look of the vehicle and instrument panel, and heightens the sense of quality of craftsmanship.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. A glove box supported by an instrument panel, comprising:

a storage compartment displaceable between an open position and a closed position; and at least one resilient arm protruding from an exterior surface of said storage compartment through an aperture in the instrument panel, said resilient arm having a first surface for contacting an edge of the aperture and deflecting said resilient arm during installation of said storage compartment and a second surface for limiting displacement of said storage compartment once installed;

wherein application of a force to said resilient arm allows displacement of said storage compartment beyond the open position allowing removal of said glove box from the instrument panel.

2. The glove box of claim 1, wherein said first surface gradually projects from said arm to deflect said resilient arm through contact with the edge.

3. The glove box of claim 2, wherein said second surface projects from said arm to contact the edge.

4. The glove box of claim 3, wherein said second surface is substantially flat and substantially perpendicular to said arm.

5. The glove box of claim 3, wherein said at least one resilient arm includes two resilient arms positioned adjacent side exterior surfaces of said storage compartment.

6. The glove box of claim 5, wherein said first and second surfaces of said two resilient arms project away from each other.

7. The glove box of claim 6 further comprising at least one hinge rib for rotatably supporting said storage compartment between the open position and the closed positions.

8. The glove box of claim 3, wherein said resilient arm includes a tab formed adjacent a distal end of said resilient arm for receiving the force, and said second surface projects from said arm adjacent to said tab.

9. A vehicle incorporating the glove box of claim 1.

10. A glove box for a vehicle, comprising:

a storage compartment displaceable between an open position and a closed position; and at least one resilient arm protruding from an exterior surface of said storage compartment, said resilient arm having a first surface for contacting an edge of a vehicle aperture and deflecting said resilient arm during installation of said storage compartment and a second surface for limiting displacement of said storage compartment once installed in the vehicle;

wherein application of a force to said arm allows displacement of the storage compartment beyond the open position, and wherein said resilient arm includes a tab formed adjacent a distal end for receiving the force.

11. The glove box of claim 10, wherein said at least one resilient arm includes two resilient arms protruding from a bottom exterior surface of said storage compartment.

12. The glove box of claim 11, wherein said first surface of each resilient arm gradually projects from said resilient arm to deflect said resilient arm through contact with the edge, and said second surface of at least one of said two resilient arms is substantially flat and substantially perpendicular to the at least one of said two resilient arms.

13. The glove box of claim 12, wherein said first and second surfaces of each resilient arm project in the same direction, and said first surface of a first resilient arm of said two resilient arms project away from said first surface of a second resilient arm of said two resilient arms.

14. The glove box of claim 10, further comprising at least one hinge rib for rotatably supporting said storage compartment between the open position and the closed position.

15. A method of removing a glove box from an instrument panel of a vehicle, comprising the steps of:
- applying a force to at least one resilient arm protruding from an exterior surface of a storage compartment of the glove box, the force sufficient to temporarily displace said at least one resilient arm allowing a second projecting surface of said at least one resilient arm to avoid contact with an edge of an aperture in the instrument panel;
- rotating the glove box from the closed position past the open position while applying the force such that the second projecting surface of said at least one resilient arm passes the edge of the aperture in the instrument panel; and
- removing the glove box from the instrument panel of the vehicle.

16. The method of removing the glove box from the instrument panel of the vehicle of claim 15, wherein the force is applied to a tab formed adjacent a distal end of said at least one resilient arm.

17. The method of removing the glove box from the instrument panel of the vehicle of claim 16, wherein the second projecting surface of said at least one resilient arm is substantially flat and substantially perpendicular to said at least one resilient arm preventing rotation of the glove box past the open position when the force is not applied.

18. The method of removing the glove box from the instrument panel of the vehicle of claim 16, wherein said at least one resilient arm includes a first projecting surface for contacting the edge of the aperture in the instrument panel and deflecting said resilient arm during installation of said glove box.

19. The method of removing the glove box from the instrument panel of the vehicle of claim 16, wherein said first projecting surface projects from said resilient arm between said tab and said second projecting surface.

* * * * *